INVENTOR.
WALTER V. BROWN
BY
Moore, White & Burd
ATTORNEYS

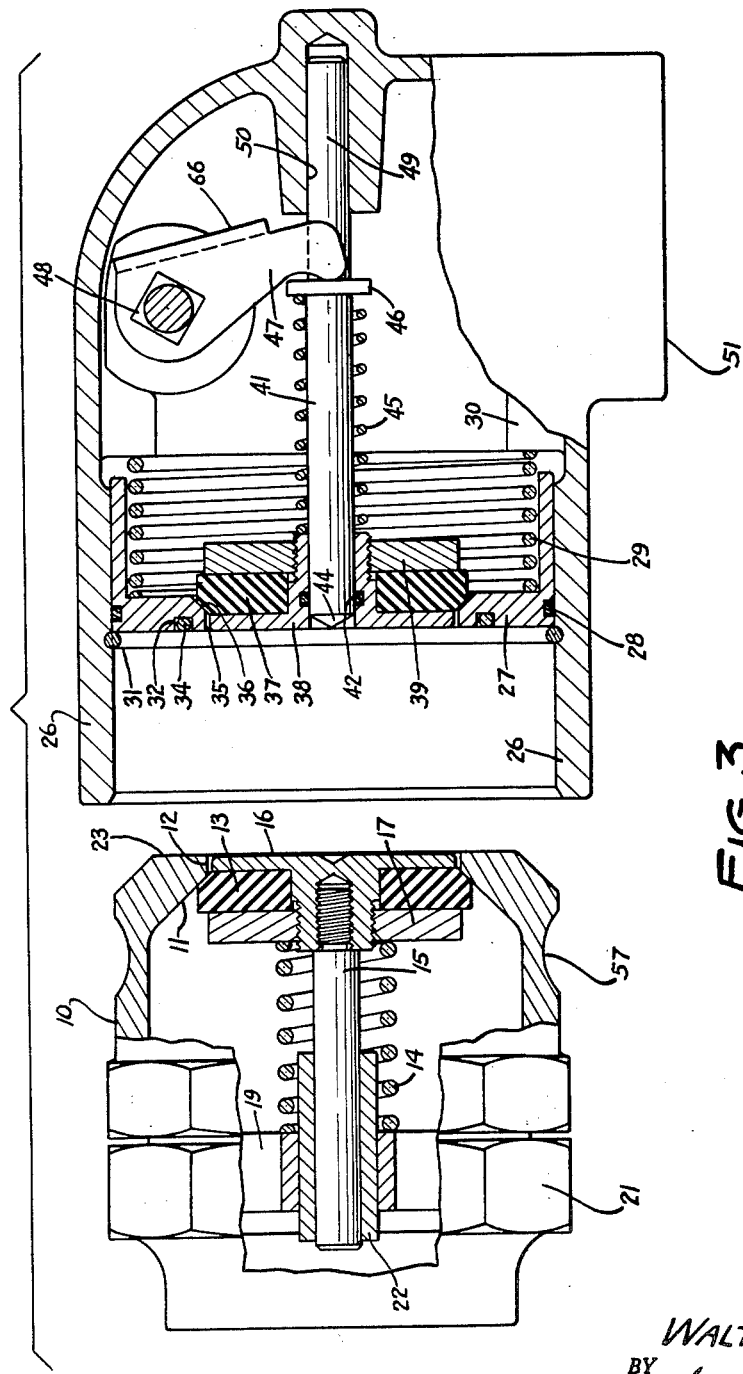

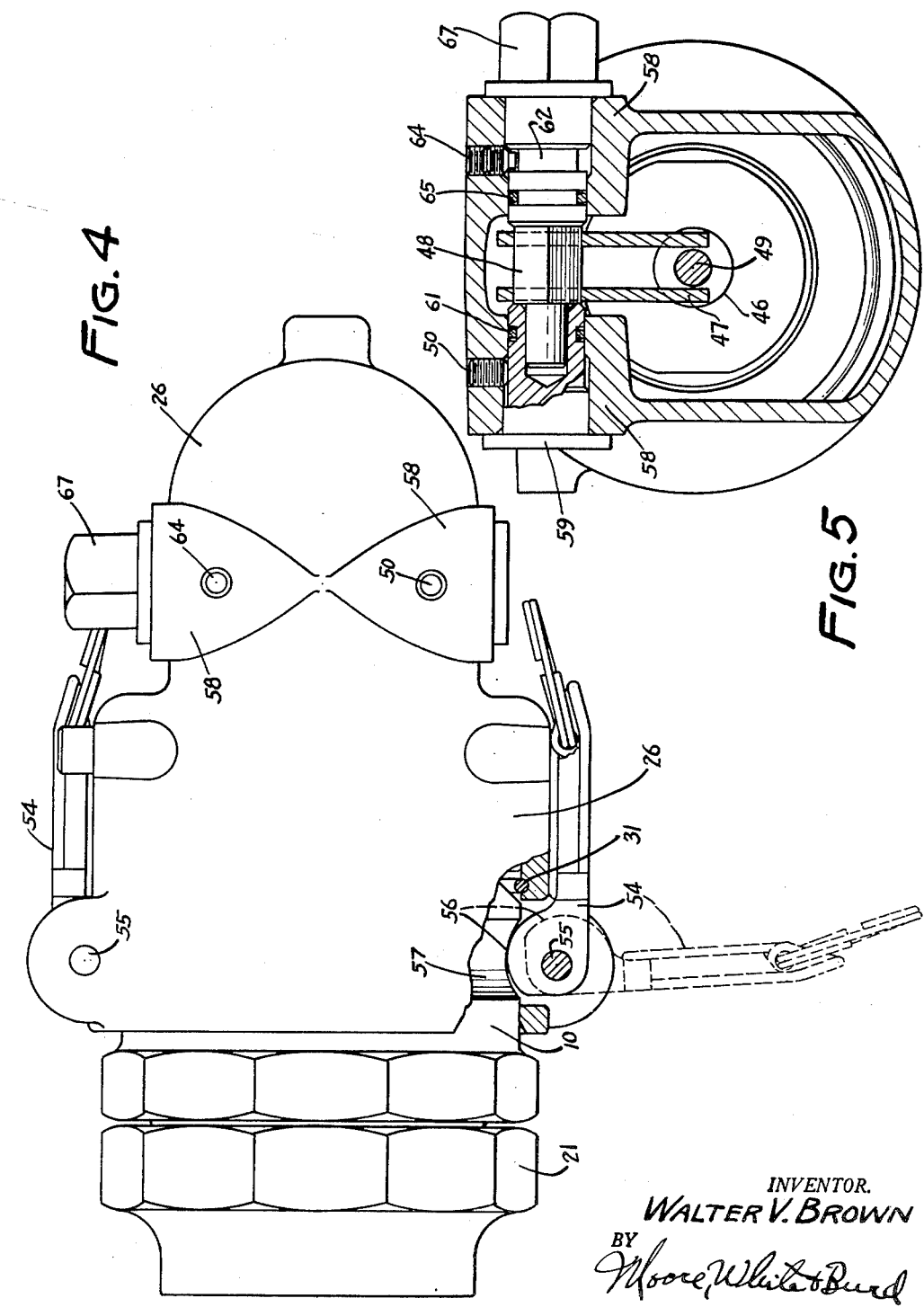

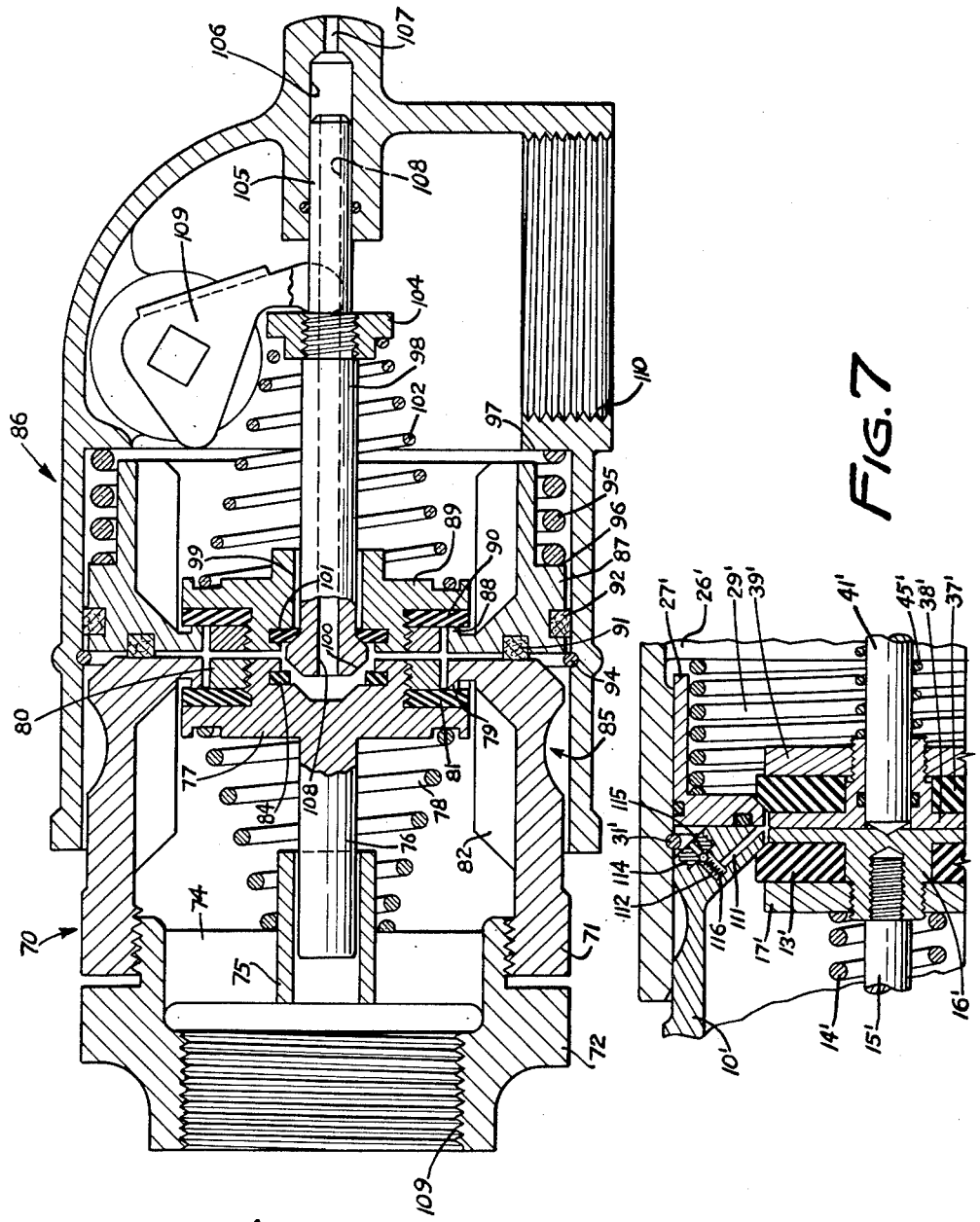

3,168,906
DISCONNECTIBLE COUPLING
Walter V. Brown, Minneapolis, Minn., assignor to Brown Steel Tank Company, Minneapolis, Minn., a corporation of Minnesota
Filed Feb. 4, 1963, Ser. No. 256,505
9 Claims. (Cl. 137—627.5)

This application is a continuation-in-part of my application bearing the same title, filed September 15, 1961, Serial No. 138,355, now abandoned.

This invention is directed to a novel faucet for use with tank trucks and similar installations where a plurality of outlets are alternately connected with a hose for directing liquid from the outlet to a desired place of deposit. Its novelty resides in an arrangement in which the faucet is formed in part in the portion of the coupling which is attached to the hose rather than entirely in that mounted on the storage unit. For this reason, a single faucet on a whip hose, for example, as used in a tank truck, may be employed with any of the various outlets from the tank truck. The faucet also incorporates a novel sliding cup-shaped element which allows for some discrepancies in the dimensions of the couplings either originally in manufacture or through wear with which the faucet is used whereby a liquid tight joint may be achieved over long periods with a number of different outlets. A still further point of novelty is achieved by having the faucet operating rod in the portion of the coupling connected to the delivery hose while the valve actually operated is within the portion of the coupling mounted on the supply unit such as the tank truck or the like.

It is a further object of novelty in this invention that the valve sealing gasket for the two halves of the coupling are substantially identical in size, thereby permitting the use of a standard sealing unit for both the male and female portions of the coupling.

A still further novel feature of this new hose coupling faucet structure is the fact that the operator need only move one of the valve members in order to actuate the valve structure. The other valve is displaced by the pressure of the liquid being dispensed.

Accordingly, it is a principal object of this invention to provide a novel disconnect faucet structure.

It is a further object of this invention to provide a novel quick disconnect coupling faucet structure in which a faucet actuating means is incorporated in the female portion of the coupling that actuates directly the valve in the male portion of the coupling.

It is a further object of this invention to provide a quick disconnect that compensates for wear and lack of identity between coupler portions with which it is used.

It is a further object of this invention to provide a faucet structure and quick disconnect coupling combination that is easily actuated by the operator by reason of the fact that the faucet actuating mechanism extends through the valve of one of the structures and engages only the valve of the other structure, the second valve being opened by the force of liquid being dispensed through the faucet.

Yet another object of this invention is to provide a faucet structure for a quick disconnect coupling type dispensing hose that may easily be repaired and restored to good working order.

A still further object of this invention is to provide a quick disconnect faucet structure in which negative pressures generated between the units may be relieved for ease of uncoupling.

It is a further object of this invention to provide a faucet for a quick disconnect coupling structure that may be easily repaired by reason of having the valve therein mounted in a slideable sleeve member which may be removed and replaced easily.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

FIGURE 3 is a view of the two portions of the coupling shown in longitudinal section as in FIGURES 1 and 2 except that the portions of the coupling are separated; broken lines show hidden parts;

FIGURE 4 is a top plan view of the structure seen in FIGURES 1 and 2 with a portion of the case broken away to illustrate the action of the quick coupling disconnect structure; broken lines illustrate an adjusted position of parts;

FIGURE 5 is a transverse section taken on the line 5—5 of FIGURE 1 with broken lines showing hidden parts;

FIGURE 6 is a longitudinal sectional view similar to FIGURE 1 of a modified form of the invention; and FIGURE 7 is a fragmentary sectional view of a still further modification.

Figure 1:
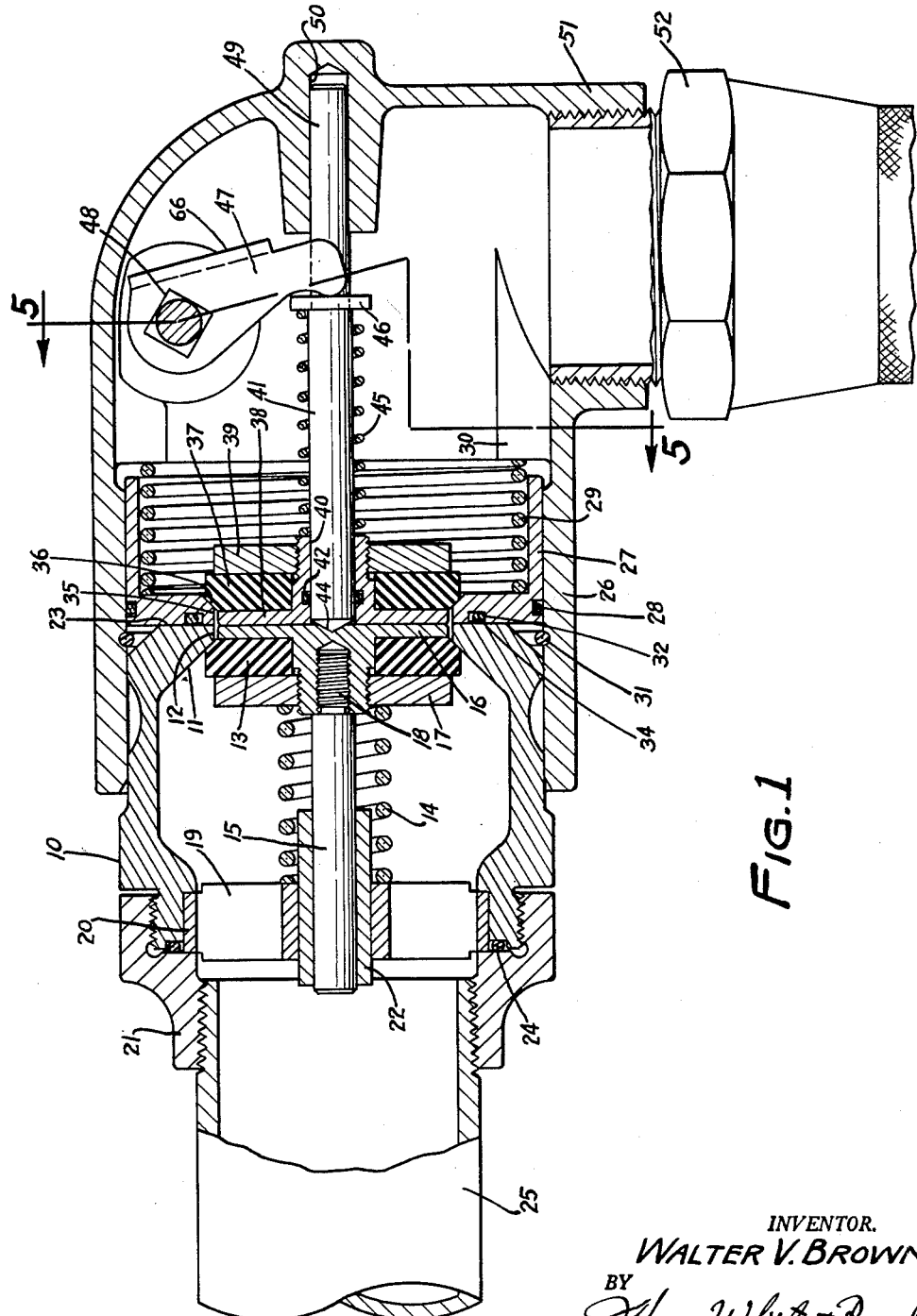
FIGURE 1 is a longitudinal sectional view through the coupling with the valves shown in the closed position with broken lines showing hidden parts.

Turning now to FIGURE 1 of the drawings, there is a male portion of the coupling 10, generally tubular in shape and having a slanting internal surface 11 that terminates in an aperture 12. The portion of the surface 11 adjacent to aperture 12 constitutes a valve seat against which the non-metallic seal 13 is normally forced by spring 14.

The seal is secured to valve stem 15 in any suitable manner as by the valve bolt 16 and nut 17 clampingly engaging the seal 13 between them. The bolt may then be secured to the valve stem 15 in any suitable manner as by the interacting threads as seen at 18 in FIGURE 1.

In order to stabilize valve stem 15 and also provide a support from which spring 14 may exert its closing influence, a spider structure as at 19 is provided. It has an external annular ring 20 which is clamped between the body portion 10 and the nut structure 21 as shown in that figure. In the center of spider 19 is a pressed bushing or the like 22 within which valve stem 15 is slidingly supported and stabilized.

The end of body 10 around aperture 12 has a sealing face 23, the use of which is more easily explained below. The joint between body portion 10 and nut 21 is sealed by suitable means such as the O-ring 24.

At 25 is seen a fragment of a pipe or the like from a storage unit such as the tank of a tank truck. It is coupled to nut element 21 in the usual manner as by the use of pipe threads or the like.

The female portion of the coupling is seen to have a body member 26 of a diameter large enough to embrace the end of body member 10. Within body member 26 is a sliding cup 27 which has an annular channel formed in it within which an appropriate seal, such as O-ring 28, seals between the cup member 27 and the inside of the bore of body 26.

At the same time, cup member 27 is movable within the body 26 and is yieldingly urged outward by a suitable resilient means such as compression spring 29 which abuts against the stops 30 and constantly urges the cup toward the open mouth of body member 26. A suitable stop means such as internal snap ring 31 engaging an internal groove in body 26 may be employed to limit the extent to which the cup 27 is forced outward by spring 29.

Cup member 27 also has an annular channel 32 formed in its bottom or what might be referred to as the face looking into the end of body 26 within which is a suitable seal such a O-ring 34. O-ring 34 bears against the sealing face 23 of body member 10 and thereby forms a liquid tight seal between the end of body member 10 and the face of cup member 27 when the two units are engaged. As shown in FIGURE 1, the engagement of these two units forces cup member 27 back slightly from the snap ring 31. A reference to FIGURE 3, where the parts have been separated, will illustrate how spring 29 forces cup member 27 out against stop ring 31 when the unit is not actually engaged for use as a coupling.

Cup member 27 has a central aperture 35 with a valve seat 36 formed on its inside and extending at the same angle relative to the aperture 35 as wall 11 does relative to aperture 12. Apertures 35 and 12 are also of the same size as may be seen in FIGURE 1 and hence the resilient seal 37 of the valve in body member 26 may be substantially identical to the one 13 in body member 10. A valve bolt 38, similar to bolt 16, and valve nut 39, identical to nut 17, secure the seal 37 between them.

While valve nut 39 may be identical to valve nut 17, the valve bolt 38 differs from valve bolt 16 in that the former has only a threaded well in its rear end in order to receive valve stem 15. Valve bolt 38, however, has a bore extending entirely through it as indicated at 40, and through which valve stem 41 is slidably received. An internal annular groove embracing the O-ring seal 42 provides a liquid tight seal between valve stem 41 and valve nut 38. Valve stem 41 is pointed on its end as at 44 and this point fits within a cooperating depression in the head of valve bolt 16. Valve seal 37 is generally forced into closing engagement with valve seat 36 by suitable resilient means such as spring 45, which abuts against the shoulder 46 on valve stem 41.

Flange 46 also serves as a means for the valve levers 47 which are pivoted with respect to valve body portion 26 on shaft 48 to apply force to valve stem 41. The rear end of valve stem 41, as is 49, is slidably received in a well 50 of the valve body portion 26. The end of valve body portion 26, most remote from its end that has the universal coupling unit, is adapted as seen at 51 in FIGURE 1 to receive the threads of a suitable distribution hose or the like, a fragment of which is shown at 52.

Turning now to FIGURE 4, means for locking the two quick disconnect units together is seen to be a usual eccentric unit in which eccentric arms 54 are pivotally mounted as at 55 in the body portion 26. When these arms are hinged to their outward position as shown by the broken lines in FIGURE 4, the eccentric portion 56 is moved outside the annular channel 57 of body portion 10. When body portion 26 has been slidably engaged in body portion 10 as far as is easily convenient and the levers 54 are placed in the position in which they are shown in solid lines in that figure, the eccentric or cam portion 56 of the locking levers engages in the annular channel 57 and locks the two units together in a well known manner.

In FIGURE 5, the faucet actuating structure is shown in some additional detail. In that figure, there will be seen a pair of bores 58 made through bosses formed on the casting of body portion 26. Into one of these bores is extended the bearing unit 59 which is locked in the housing by suitable means such as set screw 60. A sealing ring 61 insures a liquid tight seal between the bearing member 59 and the bore in the boss. Through the opposite bored boss 58 extends the faucet actuating shaft 48 which has an annular groove 62 therein receiving a retaining set screw 64. This shaft also has an annular groove therein within which a sealing ring 65 identical to sealing ring 61 provides a liquid tight seal between the interior of the bore and the exterior surface of the shaft. Set screw 64 extending into annular groove 62 permits shaft 48 to be turned and yet retains it against accidental removal from the bore of the boss.

Secured to the shaft so as to be turned thereby are the lever arms 47 which may be joined as by a back element 66. A suitable method of securing levers 47 to shaft 48 as to be moved whenever that shaft is pivoted is seen in FIGURE 1 to be a squared portion on the shaft and square holes in the lever arms 47 fitting thereon. Shaft 48 has suitable means on its exterior such as the squared end 67 which may be engaged by a suitable operating handle (not shown) which provides a means for turning shaft 48.

The operation of the device consists of placing the body portion 10 inside the end of body portion 26. With reference to FIGURE 3, it will be seen that before there is any contact between the two body portions, sleeve cup 27 is forward in engagement with snap ring 31. As the body portion 26 slides over body portion 10, however, and the seal face 23 comes into contact with the bottom of the cup 27, the latter is moved back slightly as shown in FIGURE 1.

At this time, the lock handles 54 which have been in the position illustrated in broken lines in FIGURE 4, are depressed to the position shown in solid lines in that figure. As this is done, the two halves of the quick disconnect coupling are secured together and the condition of the units will be that as illustrated in FIGURE 1.

Figure 2:
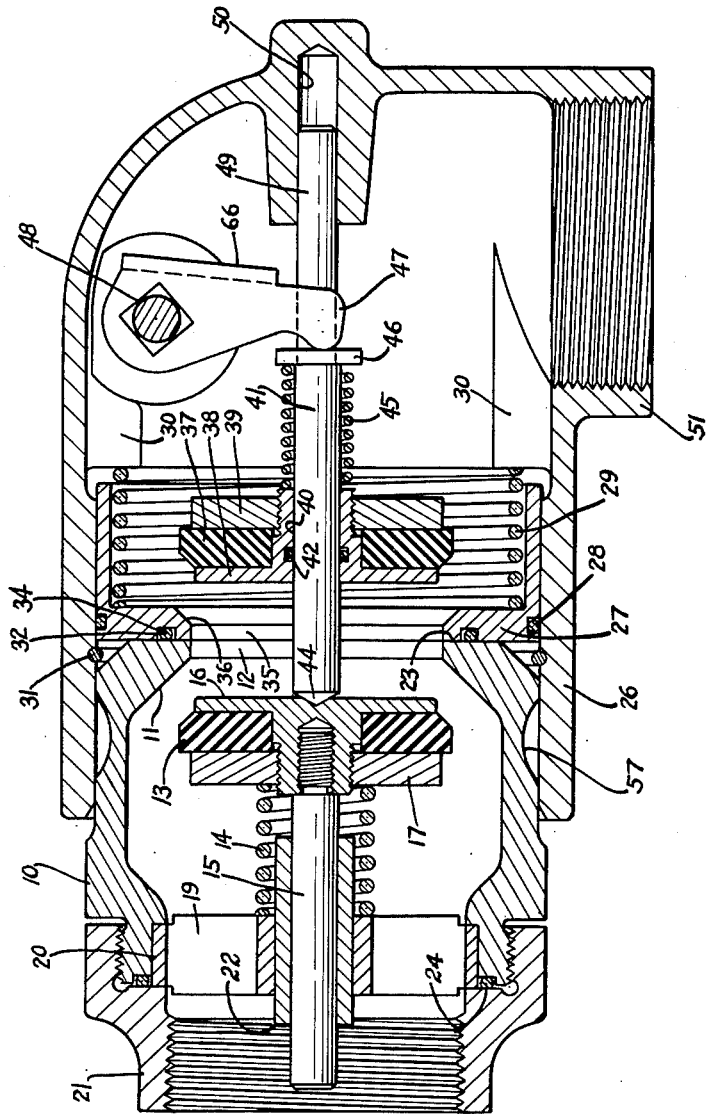
FIGURE 2 is a view similar to that shown in FIGURE 1 but with the valve shown in an open condition with broken lines showing hidden parts.

Thereafter, hose 52 is inserted in a tank filler neck or some other place to which liquid is desired to be conveyed, and the operator is ready to open the faucet. By applying a suitable handle, not shown, to squared stem 67, shaft 48 is pivoted in a clockwise direction looking at any one of FIGURES 1, 2 and 3. When this pivoting motion takes place, the valve lever arms 47 engaging flange 46 move it to the left as shown in FIGURE 2. In so doing, the valve stem 41 and more specifically the point 44 of valve stem 41 engages a depression in the head of valve bolt 16 and further pivoting of shaft 48 causes the lever arms to move valve stem 41 in the position illustrated in FIGURE 2.

This action collapses the spring 14 and moves the valve seal 13 away for the valve seat portion of wall 11. As soon as valve seal 13 is displaced from its seat, liquid under pressure flowing from pipe 25 in FIGURE 1, and not shown in FIGURE 2 for the sake of simplicity, flows past the spider 19 and around the valve seal 13 through opening 12. The liquid under pressure flowing through valve opening 12 impinges on bolt head 38 and forces the valve seal 37 to be displaced against the mild tension applied by spring 45 as also shown in FIGURE 2. As long as there is liquid under pressure being applied, the valve seal 37 will thus be disengaged from the valve seat 36 of cup member 27. This liquid under pressure then flows out through fitting 51 and the hose 52 to the place of repository of the liquid being forced through the faucet.

When the amount of liquid pumped is that desired, the operator allows the shaft 48 to pivot in a counterclockwise direction as viewed in FIGURE 2, and valve stem 41 returns to the position shown in FIGURE 1. Immediately spring 45 will return valve seal 37 to its seated position because no liquid under pressure will be impinging against it. Thereafter, the levers 54 may be returned to the broken line position illustrated in FIGURE 4 and the coupling released.

It will be seen that there is little or no space between the valve bolt heads 16 and 38, and in fact, they lightly engage each other, so that the amount of liquid lost when the faucet portion is uncoupled from the coupling portion secured to the storage tank is very slight. It will be noted that spring 14 is stronger than spring 45 so that engagement of the two valves before shaft 48 is pivoted will not accidentally open valves 11-17.

By having all of the connections from the storage tank provided with the body portion 10 and its other components, the actuating mechanism can be moved from outlet pipe to outlet pipe. The lever controlling the action of the valves in the outlets will be retained with the hose and, therefore, only one is necessary even though there be a plurality of outlets. In a manner of speaking, therefore, there is a plurality of faucet valves on the truck with the operating mechanism carried by the hose which may be selectively secured to any one of the outlets for the purpose of operating it.

Another feature of this structure is its design, arranged for ease of both manufacture and maintenance. It will be noted that if nut 21 is removed from the body portion 10, the spider 20 and the valve stem and related parts carried by it may be removed rearward out through the opening provided by the removal of nut 21. As the valve nut and bolt securing seal 13 are threaded together, they may be easily disassembled and the seal replaced as needed. Any other part may be easily replaced also and the valve reassembled by reversing the procedure described for disassembling it.

In the case of body portion 26, snap ring 31 when removed releases substantially all of the valve parts for replacement or repair. With snap ring 31 removed, the cup 27 slides out. As cup 27 is the largest internal part contained in body portion 26, all other parts can be removed easily once it is out. If necessary, the valve arms 47 may be replaced easily by removing set screw 64 and extracting shaft 48 from the arms 47. Thus, there is substantially no portion of the valve that is not readily accessible for repair or replacement, as the case may be, in the use of this novel valve structure.

In FIGURE 6 is shown a modified form of the faucet which is very similar in general theory, operation and structure to that illustrated in FIGURES 1-5. It varies from that structure in many constructional details, however, and in one principal way which consists of venting the area between the two structures to the outside atmosphere whenever the valves are turned off. As seen in FIGURE 6, there is a male fitting portion generally designated 70 consisting of a principal body portion 71 and a body portion closure element 72. Body portion closure element 72 carries a spider 74 which in turn supports a bearing means 75 within which the shank 76 secured to valve head 77 may slide. A suitable spring 78 is mounted to engage the spider 74 and the valve head 77. This spring yieldingly urges the valve head 77 toward annular valve seat 79 which is formed adjacent the open end 80 of the male fitting member. Suitable gasket as at 81 is secured to the valve head and engages the annular valve seat. The shoulders of the male member 71 may be reinforced suitably as by the webbing 82. The front end of the valve facing outwardly toward openable end 80 of the body portion 71 is a cavity in which a suitable sealing ring 84 may be seen. The purpose of this sealing ring will be made clear below.

Body member 71 also has an annular groove 85 to accommodate fastening means like those shown in FIGURE 4. They are omitted here to avoid confusion. Furthermore, this securing structure is more or less conventional and it is therefore not shown or described in connection with the structure of FIGURE 6.

A female body member 86 is adapted to receive male body portion 70, and this member 86 carries a portion of the securing structure such as that shown in FIGURE 4 but which is not illustrated herein.

In the female body portion 86 is a sliding cup comparable to the element 27 in FIGURES 1-5, the sliding cup being identified herein as 87. There also is provided an annular valve seat 88 on which the valve head 89 may seat as described herein. A sealing gasket 90 is secured to valve head 89 similarly to gasket 81 to valve head 77. In the face of cup 87 is a groove carrying a sealing ring 91. An annular groove around the outside of cup 87 carries a similar sealing gasket 92. These gaskets are comparable to the gaskets 32 and 28 respectively in the structure disclosed in FIGURES 1-5. An internal snap ring 94 serves to hold cup 87 from extending excessively under the influence of spring 95 which engages a shoulder 96 on cup 87 and a shoulder 97 inside the body member 86.

As illustrated in FIGURE 6, the male body portion 71 has barely engaged the seals 91. The latch members have not forced the body member 71 in as far as it will when in a latched position. When the coupling is fully latched, it will force cup 87 slightly to the right comparably to FIGURE 7, compressing spring 95. The purpose of this structure is to assure a liquid tight seal between the male body member and the cup member 87 and at the same time allow for some wear on all of the parts. If seal 91 were mounted in a rigidly formed portion of the female body portion 86, initial sealing and perhaps sealing for a substantial period of time could be maintained well. With continued use, however, the gradual wearing of seal 91 and/or the latch parts that hold the two elements together could permit some leakage at this point. By using the yielding cup member 87, however, it is possible to accept some slight overtravel of the male body member 71 initially which will compensate for the gradual wear of the unit.

The structure of cup 87 is distinguished from that of the cup member 27 in a form shown in FIGURES 1-5 and 7 in that spring 95 is on the outside rather than the inside.

Operating shaft 98 fits somewhat more loosely within the valve head 89 than does the comparable shaft in FIGURES 1-5. Shaft 98 passes through a passageway 99 formed in valve head 89 and has a head 100 which is held tightly against the seal 101 by spring 102. The shaft 98 is held back in this sealed relation whenever the semiconically shaped spring 102 pushes back on collar 104 and is extended as shown in FIGURE 6. The collar 104 may be secured to the shaft 98 in any suitable manner and shown here as being threaded thereon. It need not by removable for the sake of performance but only to provide means for assembling spring 102 on the shaft 98.

The end of shaft 98 that extends beyond the collar 104 is identified by the number 105. This portion 105 is of reduced diameter and extends into a suitably milled well 106 in the body portion 86. Well 106 is vented to the outside as shown at 107. Shaft 98 is provided with a center bore 108 which extends entirely through it. Thus, the area between the valve head 77 and 89 may be vented to the surrounding atmosphere via bore 108 whenever the shaft 98 is in the position illustrated in FIGURE 6.

Suitable means for advancing the shaft 98 is shown a 109 which may be of any type and here shown as structure the same as that in FIGURES 1-5 at 47-48.

The unit operates essentially as does the structure illustrated in FIGURES 1-5 in that as the operating mechanism 109 is moved to advance collar 104, spring 102 is compressed and shaft 98 is moved forward until head 100 engages seal 84. The engagement of head 100 with seal 84 effectively seals bore 108 from the space between the two valve heads and further advancing of the shaft 98 by turning the operating mechanism 109 causes valve seat head 77 to be unseated from the valve seat 79. Spring 78 is of course compressed in this process and as the valve head 77 is unseated, fuel pressure will unseat valve head 89 and a passageway for fuel through the connecting units is thereby provided.

When the operating mechanism is released, valve 77 under the influence of spring 78 immediately recedes itself and upon so doing, fuel pressure is relieved, causing the valve 89 to seat substantially simultaneously. Upon release of shaft 98, it returns to the position illustrated in FIGURE 6 and the area between the two valve portions is vented to the surrounding atmosphere. Thus, even if a negative pressure has been applied, as for example in preventing a surge of liquid through the units to prevent sudden build up of pressures as a shut-off of fluid flow occurs, the two sections may be easily disconnected because of vent bore 108.

The structure is provided with the usual joinder threadings as shown at 109 for the male member and 110 for the female member.

In FIGURE 7 is illustrated another form of the structure designed to relieve the pressure between two such members, a fragment of structure that generally corresponds to that illustrated in FIGURES 1-5 appears and are therefore given the same numbers as appear in those figures followed by a prime as 10' and 26', for example.

At 111, however, is shown a drilled passageway that extends into the area between the two valve heads 16 and 38. This passageway joins a bored valve well 112 which is closed by suitably pierced valve seat member 114. A ball 115 closes the valve seat or opening in valve head member 114 and a light spring 116 keeps ball 15 normally seated. When the male member 10 is to be disassociated from female member 26, however, particularly if there is a low pressure existing between the valve head portions 16 and 28, outside atmospheric pressure, which has access to the area adjacent to valve head member 114, will overcome the spring 116 and enter through the valve 111-112 and bored passageway 111 to provide atmospheric pressure between the two units, thereby allowing their ready release.

It is to be understood that the valve structure 111-116 may be used in a faucet structure such as that shown in FIGURE 6 and that similarly the structure illustrated in FIGURES 1-5 may be provided with a bored control rod as shown in FIGURE 6.

It is apparent that many modifications and variations of this invention as hereinbefore set forth may be made without departing from the spirit and scope thereof. The specific embodiments described are given by way of example only and the invention is limited only by the terms of the appended claims.

What is claimed:

1. A quick disconnect faucet comprising: a tubular member, a cup slidably mounted in said tubular member, a sliding gasket means between said cup and said tubular member, a stop within said tubular member, a spring compressed between said cup and said stop, and a second stop on the inside of said tubular member spaced from said first stop means and limiting the extent to which said spring may slide said cup with relation to said tubular member, said cup having an opening in its center bottom comprising a valve seat, a valve yieldingly engaging said valve seat, said valve being bored, a rod slidable in said valve bore, and means engaged with said rod and extending exteriorly of said tubular member for sliding said rod relative to said valve.

2. The structure of claim 1 further characterized by a cooperating coupling means that extends further into said tubular member than said second stop, a gasket secured to the bottom of said cup surrounding said cup valve seat, and said cooperating coupling means having a seal face at its end that extends farther into said tubular member than said second stop.

3. The structure of claim 2 in which said rod is pointed at its end and said valve of said cooperating coupling means is provided with a central cone shaped recess in its face adjacent said seal face.

4. The structure of claim 2 in which means is provided in one of said faucet and coupling to vent the space occupied by said faucet and cooperating coupling means to the surrounding atmosphere when they are coupled and said faucet turned off.

5. A quick disconnect coupling and faucet structure comprising: a male member having a portion of a quick disconnect coupling structure thereon, a valve opening and seat formed in said male member, a valve movably engaging said valve seat, a means urging said valve yieldingly into engagement with said valve seat, a female member embracing said male member and having the cooperating portions of quick disconnect coupling structure thereon, a cup slidably mounted within said female member, a groove in the outside of said cup, an annular seal in said groove engaging said cup and the inside of said female member, a stop spaced inwardly from the end of said female member to limit outward motion of said cup, a second stop in said female member spaced inwardly from said cup, a spring compressed between said second stop and the inside of said cup forcing said cup against said first mentioned stop when said members are disassociated, a valve opening and seat in the bottom of said cup practically identical to the opening and seat in said male member, a valve yieldingly engaging said valve seat in said cup, a channel surrounding the opening in the bottom of said cup, a sealing means placed in said channel, a sealing face formed on the end of said male member and adapted to engage said sealing means in the annular channel in the bottom of said cup, a bore formed in the valve in said cup, an elongated member slidably mounted in said bore of said valve in said cup, and means extending through the side wall of the case of said female member for engaging and moving said elongated member at will, said elongated member when moved by said means extending through the case of said female member engaging and displacing from its seat said valve in said male member when said coupling members are engaged, said sealing face on said male member extending into said female member farther than said first stop means.

6. The structure of claim 5 in which the means urging said cup valve against its seat applies less force than the pressure of the system in which said faucet is used will generate when applied to the face of said cup valve.

7. The structure of claim 5 in which means is provided in one of said male and female members for venting the space between their valves to the surrounding atmosphere when said members are coupled and said valves seated.

8. The structure of claim 5 in which said elongated member is longitudinally bored, means is provided on the face of the valve of said male member for sealing the bore in said elongated member at its inner end when it is displacing the valve of said male member and a vent in said female member slidably and sealing engaged with the other end of said bored elongated member.

9. The structure of claim 5 in which said male member is provided with a passageway communicating between the space occupied by said male member and cup when said male and female members are coupled, and a check valve in said passageway preventing fluid flow from the inside out.

References Cited in the file of this patent

UNITED STATES PATENTS

| 1,850,063 | Pepper | Mar. 15, 1932 |
| 2,758,768 | Payne | Aug. 14, 1956 |
| 2,792,014 | Granberg | May 14, 1957 |
| 3,106,222 | Charles | Oct. 8, 1963 |

FOREIGN PATENTS

| 527,938 | Italy | of 1955 |